United States Patent
Yoon et al.

(10) Patent No.: US 11,752,451 B2
(45) Date of Patent: Sep. 12, 2023

(54) METHOD FOR DEWATERING AND DEMINERALIZATION OF FINE PARTICLES

(71) Applicant: Virginia Tech Intellectual Properties, Inc., Blacksburg, VA (US)

(72) Inventors: Roe-Hoan Yoon, Blacksburg, VA (US); Gerald Luttrell, Blacksburg, VA (US); Nikhil Gupta, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 16/793,726

(22) Filed: Feb. 18, 2020

(65) Prior Publication Data
US 2020/0179821 A1    Jun. 11, 2020

Related U.S. Application Data

(60) Division of application No. 15/783,389, filed on Oct. 13, 2017, now Pat. No. 10,561,964, which is a
(Continued)

(51) Int. Cl.
*B01D 12/00* (2006.01)
*B01F 23/53* (2022.01)
(Continued)

(52) U.S. Cl.
CPC .......... *B01D 12/00* (2013.01); *B01D 11/0492* (2013.01); *B01F 23/53* (2022.01);
(Continued)

(58) Field of Classification Search
None
See application file for complete search history.

(56) References Cited

U.S. PATENT DOCUMENTS 3,601,369 A    8/1971   Wahl
3,647,066 A    3/1972   Potts et al.
(Continued)

FOREIGN PATENT DOCUMENTS

CN    203408648 U  *  1/2014
GB    2003739 A       3/1979
(Continued)

OTHER PUBLICATIONS

S. Maiti, et al., Removal of oil from oil-in-water emulsion using a packed bed of commercial resin, Colloids and Surfaces A: Physiochem. Eng. Aspects 389 (2011) 291-298. (Year: 2011).*
(Continued)

*Primary Examiner* — Chester T Barry
(74) *Attorney, Agent, or Firm* — Grossman, Tucker, Perreault & Pfleger, PLLC

(57) ABSTRACT

Hydrophobic particles such as coal and hydrophobized mineral fines can be readily separated from hydrophilic impurities by forming agglomerates in water using a hydrophobic liquids such as oil. The agglomerates of hydrophobic particles usually entrap large amounts of water, causing the moisture of the recovered hydrophobic particles to be excessively high. This problem can be overcome by dispersing the hydrophobic agglomerates in a hydrophobic liquid that can be readily recycled. The dispersion can be achieved using specially designed apparatus and methods that can create a turbulence that can help destabilize the agglomerates in a recyclable hydrophobic liquid and facilitate the dispersion.

4 Claims, 9 Drawing Sheets

Related U.S. Application Data continuation of application No. PCT/US2016/027327, filed on Apr. 13, 2016.

(60) Provisional application No. 62/146,655, filed on Apr. 13, 2015.

(51) Int. Cl.
    *B01F 25/4314*     (2022.01)
    *B01F 27/81*     (2022.01)
    *B01F 27/1111*     (2022.01)
    *B01F 31/65*     (2022.01)
    *B01D 11/04*     (2006.01)
    *C10L 9/00*     (2006.01)

(52) U.S. Cl.
CPC ..... *B01F 25/43141* (2022.01); *B01F 27/1111* (2022.01); *B01F 27/81* (2022.01); *B01F 31/65* (2022.01); *C10L 9/00* (2013.01); *C10L 2290/08* (2013.01)

(56) References Cited

U.S. PATENT DOCUMENTS

| | | | |
|---|---|---|---|
| 5,910,467 A * | 6/1999 | Bragg | E21B 43/32 |
| | | | 507/202 |
| 6,467,947 B1 | 10/2002 | Welsh | |
| 7,550,120 B2 | 6/2009 | Giralico | |
| 8,443,981 B1 | 5/2013 | Eldridge | |
| 9,789,492 B2 | 10/2017 | Yoon et al. | |
| 10,561,964 B2 | 2/2020 | Yoon et al. | |
| 2001/0054575 A1 | 12/2001 | Kelsey | |
| 2003/0198129 A1 | 10/2003 | Haughton et al. | |
| 2013/0111808 A1 * | 5/2013 | Yoon | B03B 9/005 |
| | | | 44/505 |
| 2013/0340328 A1 * | 12/2013 | Yoon | C10L 9/10 |
| | | | 44/505 |

FOREIGN PATENT DOCUMENTS

| | | | | |
|---|---|---|---|---|
| GB | 2276559 A | * | 10/1994 | ......... B01F 11/0071 |
| JP | 2003326103 A | | 11/2003 | |
| JP | 3545784 B2 | * | 7/2004 | |
| RU | 2538578 | | 1/2015 | |
| WO | 1994-022567 | | 10/1994 | |
| WO | 1994022567 A1 | | 10/1994 | |

OTHER PUBLICATIONS

Chilean Office Action dated Jan. 14, 2019 in corresponding Chilean Patent Application No. 2584-2017.
International Search Report and Written Opinion dated Jul. 15, 2016 in corresponding PCT Patent Application No. PCT/US16/27327.
ARIPO Office Action dated May 26, 2020 in corresponding ARIPO Patent Application No. AP/P/2017/010286.
Indian Office Action dated May 28, 2020 in corresponding Indian Patent Application No. 201717039946.
Russian Office Action dated Aug. 7, 2019 in corresponding Russian Patent Application No. 2017139264.
Examination Report from related Australian Application No. 2021205056 dated Jun. 30, 2022. pp. 1-8.
Canada Office Action from related application 2,982,558 dated Jul. 5, 2002.
Office Action from related Canadian Appln. No. 2,982,558, dated Feb. 21, 2023. English translation attached. 4 pages.

* cited by examiner

METHOD FOR DEWATERING AND DEMINERALIZATION OF FINE PARTICLES

CROSS-REFERENCE

This application is a divisional of U.S. patent application Ser. No. 15/783,389 filed Oct. 13, 2017, now U.S. Pat. No. 10,561,964, which is a continuation of International Patent Application PCT/US2016/027327, filed on Apr. 13, 2016, and published as WO2016/168325, which claims the benefit of U.S. Provisional Application No. 62/146,655, filed on Apr. 13, 2015, the disclosures of which are incorporated herein by reference.

FIELD OF THE INVENTION

The instant invention pertains to apparatus and methods for dispersion of agglomerates of hydrophobic particles, e.g. coal and hydrophobic minerals, in a continuous phase of hydrophobic liquid. The dispersion dewaters the hydrophobic particles by releasing water droplets trapped in the agglomerates along with the hydrophilic particles dispersed in the droplets.

BACKGROUND OF THE INVENTION

Coal is an organic material that is burned to produce heat for power generation and for other industrial and domestic applications. However, it has inclusions of mineral matter, which may contain undesirable elements such as sulfur and mercury. Coal combustion can thus produce large amounts of ash, fugitive dusts, mercury, and $SO_2$ that may need to be handled properly. Therefore, run-of-mine (ROM) coals are cleaned of the mineral matter before utilization, which also helps increase combustion efficiencies and thereby reduces $CO_2$ emissions. In general, coarse coal (50×0.15 mm) can be cleaned efficiently by exploiting the specific gravity (SG) differences between the organic matter (coal) and the inorganic mineral mailer.

ROM coal can have a large variability of moisture and maximum particle size. The range of particle size spans from coarse coal to finely ground or pulverized coal. Slurries of coarse particles are easier to process and dewater than slurries of fine particles.

U.S. Patent Application Publication Nos. 2013/0111808 and 2013/0340328, now U.S. Pat. No. 9,518,241, which publications are incorporated herein by reference, disclose a process for cleaning and dewatering coal fines of less than ~0.15 mm in size by first agglomerating the hydrophobic (or organic) coal in an aqueous slurry in the presence of a hydrophobic liquid (or oil). The hydrophobic agglomerates are then separated from the mineral matter dispersed in aqueous phase using an appropriate size-size separation method such as screening. During the process of forming the agglomerates, droplets of water are entrapped in between the hydrophobic particles constituting the agglomerates. Therefore, the hydrophobic agglomerates are broken (or destabilized) by a mechanical means to disengage (or liberate) the entrapped water droplets from coal particles. The breakage step is carried out in a hydrophobic liquid phase, so that the hydrophobic particles are readily dispersed. If the hydrophobic particles are fully dispersed, most of the water droplets are liberated from coal and fall to the bottom, forming an aqueous phase. When the water droplets are separated from coal in this manner, the hydrophilic mineral matter dispersed in them are also separated from coal.

If the hydrophobic-hydrophilic separation (HHS) process described above is carried out in a hydrophobic liquid that can form large contact angles ($\theta$) in excess of 90° on the coal particles suspended in water, the hydrophobic liquid displaces the surface water, or the water molecules adhering on the surface of coal particles. This mechanism, known as dewatering by displacement (DbD) has been disclosed in the U.S. Patent Application Publication Nos. 2013/0111808 and 2013/0340328. These applications disclose methods of utilizing the HHS and DbD mechanisms (or processes) simultaneously to produce low-moisture and low-ash coal products from a variety of fine coal slurries that are generated from coal preparation plants. The moisture levels that can be achieved by following the steps disclosed in the aforementioned disclosures are comparable to those achieved by thermal drying, which is costly and creates environmental concerns.

When hydrophobic agglomerates are placed in a hydrophobic liquid such as n-pentane, water-in-oil emulsions are formed, with the hydrophobic particles serving as emulsion stabilizer or effectively as "solid surfactants." The amount of energy (E) required to detach the hydrophobic particles from the oil/water interface may be estimated using the following relation (Binks, B. P., Current Opinion in Colloid and Interface Science, 7, 2002, p. 21), $$E=\pi r^2 \gamma_{O/W}(1+\cos \theta) \quad [1]$$

where $\gamma_{O/W}$ is the oil/water interfacial tension, r is the particle radius, and $\theta$ is the contact angle measured through the aqueous phase. Eq. [1] suggests that the higher the contact angle, the lower the energy required to disperse the hydrophobic particles in a hydrophobic liquid (or oil) phase. Eq. [1] suggests also that the smaller the particles, the lower the energy required to break hydrophobic agglomerates and disperse the particles in a hydrophobic liquid.

In the aforementioned U.S. patent applications, the hydrophobic liquids are chosen from shorter-chain n-alkanes and alkenes, both unbranched and branched, and cycloalkanes and cycloalkenes, with carbon numbers less than eight. These and other hydrophobic liquids such as ligroin (light naphtha), naphtha and petroleum naphtha, and mixtures thereof have contact angles ($\theta$) greater than 90°, so that hydrophobic particles can be detached from water/oil interfaces with minimal energy expenditures and readily dispersed in the organic liquids. Furthermore, these hydrophobic liquids have low viscosities and low boiling points, so that they can be readily recovered by solid/liquid separation (e.g., pressure filtration) and by vaporization/condensation for recycle purpose. Liquid carbon dioxide ($CO_2$) is another liquid that can be used as a hydrophobic liquid in the instant invention.

In the oil sands industry, bitumen is recovered by flotation and the recovered bitumen is further treated by dissolving the froth product in a hydrophobic liquid and subsequently removing entrained water along with the hydrophilic particles such as clay dispersed in the water droplets. During this step, water-in-oil emulsions are formed, causing a difficulty in dewatering. At present, the water-in-oil emulsions are destabilized using various chemicals. It is possible that the method and apparatus disclosed herewith may be used to destabilize the emulsions and facilitate the dewatering process.

SUMMARY OF THE INVENTION

An object of the present invention relates to an apparatus for dispersion of hydrophobic agglomerates and/or waterin-oil-emulsions stabilized by hydrophobic particles in a hydrophobic liquid. The hydrophobic agglomerates may comprise coal or other fine particles that are either naturally hydrophobic or hydrophobized using hydrophobizing reagent(s). The apparatus comprises a tank or a tubular pipe. Inside the tank or pipe is at least one turbulence-generating mechanism that can break the agglomerates (or emulsions) using an appropriate mechanical device.

Another object of the present invention relates to methods of using the apparatus to mechanically break the hydrophobic agglomerates and disperse them in a continuous phase of hydrophobic liquid.

A further object of the present invention relates to methods for making the apparatus for dispersion of hydrophobic agglomerates.

A still further object of the present invention relates to using the methods and apparatus to destabilize the water-in-oil emulsions stabilized by asphaltenes during the process of dewatering the bitumen recovered by flotation.

BRIEF DESCRIPTION OF THE DRAWINGS

The foregoing background and summary, as well as the following detailed description of the drawings, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENT

The present invention relates to apparatus for destabilizing hydrophobic agglomerates and dispersing hydrophobic fine particles in a hydrophobic liquid. The apparatus comprises a tank or tubular container. Inside the container is placed a turbulence generating mechanism that can provide sufficient energy to break (or destabilize) the agglomerates and disperse the particles in a hydrophobic liquid. The turbulence-generating mechanisms include, but are not limited to, i) at least one vibrating mesh screen whose center is attached to a shaft, ii) at least one dynamic impeller, iii) at least one static and dynamic in-line mixer, iv) a pneumatic or mechanical pulsating mechanism that can reciprocate the suspension of hydrophobic agglomerates through the tortuous path created by a bed of packed materials, v) a pneumatic or mechanical pulsating mechanism that can reciprocate the suspension of hydrophobic agglomerates through a bed of particles located on a screen, and vi) a sonicator to create sufficient mechanical force to break hydrophobic agglomerates.

Figure 1:
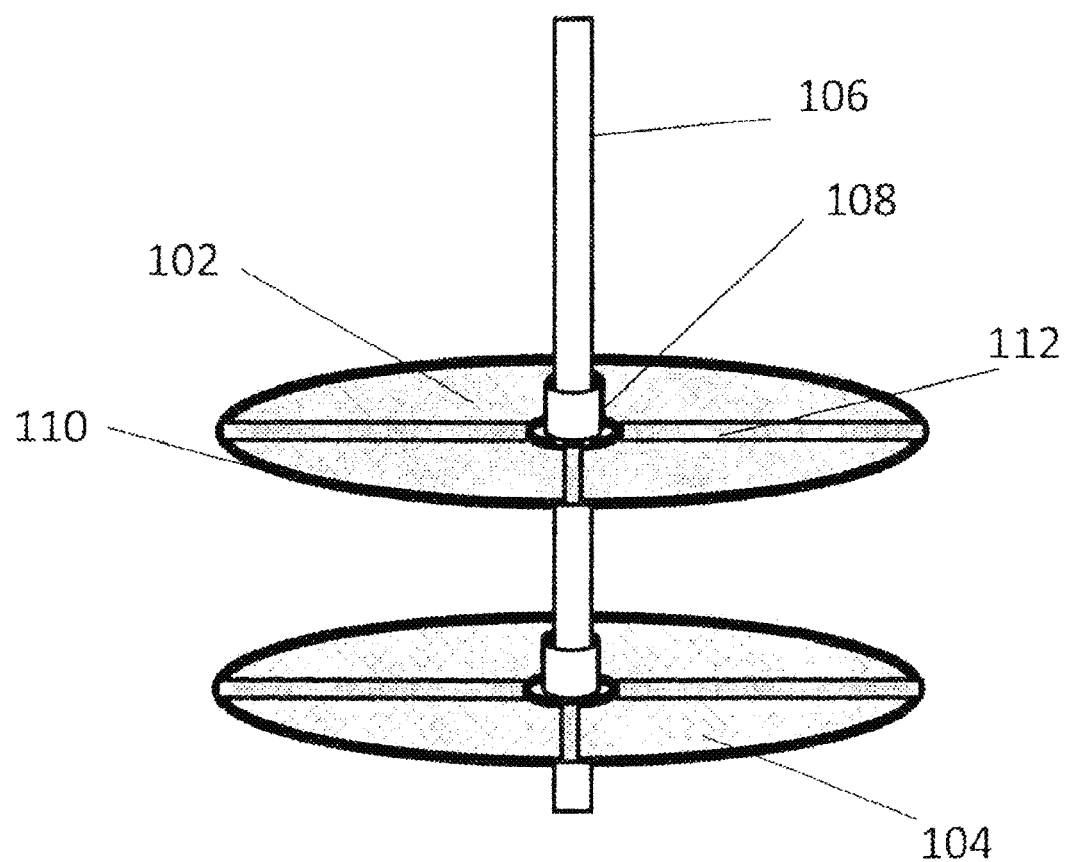
FIG. 1 is a drawing showing an assembly of vibrating screens that are designed to provide adequate mechanical force to break hydrophobic emulsions.

Referring to FIG. 1, there is shown an embodiment of the present invention where two mesh screens 102 and 104 are attached to a single shaft 106. In an embodiment, the shaft 106 may be a cylindrical metal rod. The attachment of each of the screens 102 or 104 to the shaft 106 may be by a collar 108. The collar 108 fits around the shaft and may be attached to the shaft by a suitable fastener, such as crews, bolts, clips, etc. The method for attachment is not important as long as the screen 102 or 104 is secured to the shaft 106 without allowing for sliding of the screen along the length of the shaft during operation. The shaft is connected to a reciprocating motor 204 designed to vibrate the mesh screen in a vertical direction as shown in FIGS. 2 and 3.

The screen 102 or 104 is preferably stabilized by a ring 110 at its outer circumference. The ring may be made of a metal or a polymer and provides sufficient rigidity to hold the screen flat without collapsing during operation. The screen may also be further stabilized by at least one supporting rod 112, extending from the center of the screen to the ring 110. The supporting rod 112 is rigidly attached to the ring 110 to further stabilize the screen. Although FIG. 1 shows rods intersecting at about 90 degrees, any number of rods may be used to stabilize the screen. Preferably, the rods are spaced evenly around the screen to provide an even support of the screen. Like the ring 110, the supporting rod may be made of a metal or a polymer as long as it provides sufficient rigidity to hold the screen flat without collapsing during operation.

Figure 2:
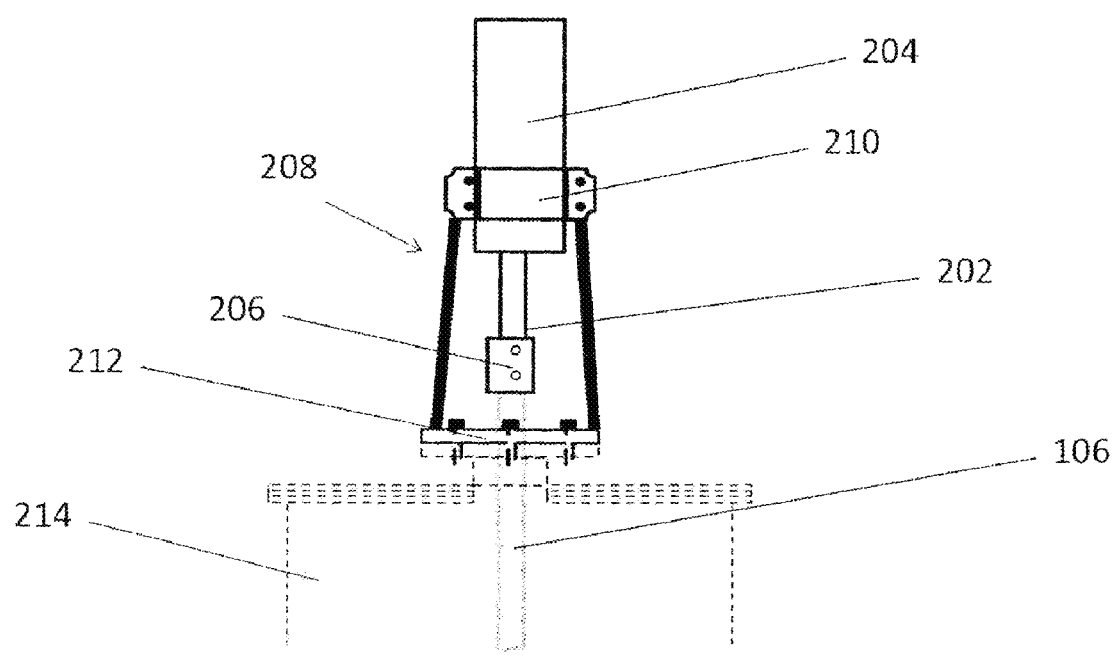
FIG. 2 is a drawing showing the connection between the screen assembly and the motor.
Figure 3:
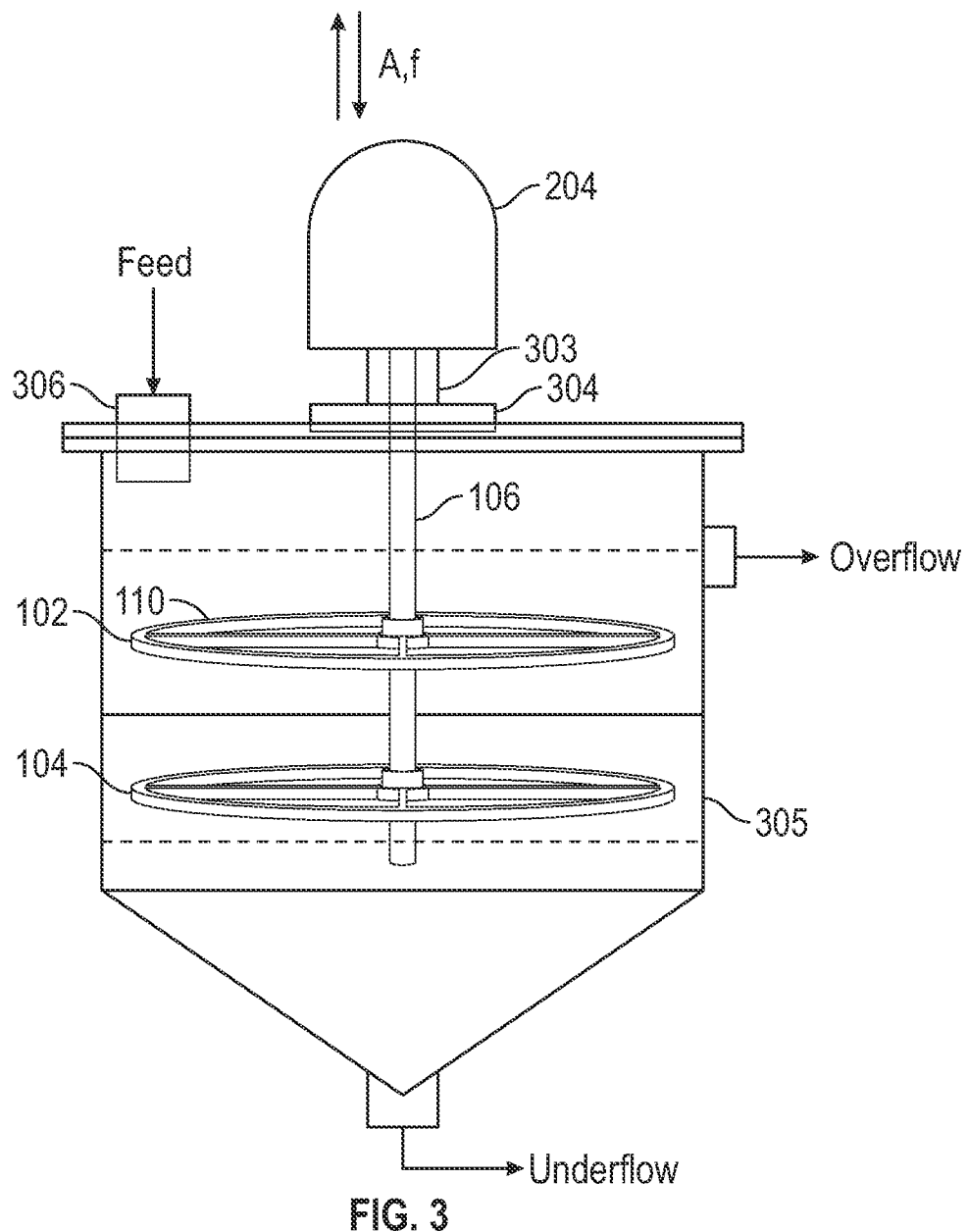
FIG. 3 is a drawing showing the screen assembly and the motor installed in a cylindrical tank.

One end of the shaft is connected to a reciprocating motor 204 of FIGS. 2 and 3. Referring to FIG. 2, there is shown a mechanism for such attachment. The shaft 106 is connected to the shaft 202 of the reciprocating motor 204, e.g. by an adaptor 206 which rigidly and coaxially attaches the shaft 106 to the motor shaft 202. The connection allows for the translation of the reciprocating motion of the motor shaft 204 to be transferred to the shaft 106.

In a preferred embodiment, a supporting structure 208 is provided to further stabilize the connection between the motor 204 and the shaft 106. The support structure preferably contains a clamp 210, a flange 212, and connecting rods 214 connecting the clamp 210 to the flange 212. The clamp 210 fits around and clamps to the body of the motor 204. The flange 212 is essentially a flat disc-shape assembly with a hole in the middle of the disc where the shaft 106 passes through. The hole allows the shaft 106 to fit therethrough but not so tightly that it impedes the vertical motion of the shaft. Essentially, the hole allows the shaft 106 to move in a direction approximately vertical to the plane of the disc, but prevents motion of the shaft in a direction approximately parallel to the plane of the disc. The clamp 210 and the flange 212 are rigidly connected to each other by the connecting rods 214 to form a rigid structure to support the connection between the motor 204 and the shaft 106 to allow for a smooth transfer of the reciprocating motion to the shaft 106.

FIG. 3 shows the screen assembly installed in a tank. In use, the shaft and screens are then placed inside the tank 305. The placement is such that the ring 110 is not in contact with the side of the tank 305. As such, it is preferable that the ring has a largest diameter that is, about 70-95% of the inner diameter of the tank, preferably about 80-90%. To isolate hydrocarbon vapors from outside atmosphere, a vapor tight boot 303 and seal 304 may be installed around the shaft outside the reactor.

In operation, agglomeration (resulting from mixing of fine hydrophobic particles in an aqueous media with a hydrophobic liquid) and a hydrophobic liquid are added to the tank 305 through an inlet pipe 306. The motor 204 is then activated to allow the shaft 106, and thereby the screens 102 and 104, to move in a reciprocating motion. That allows the screens 102 and 104 to vibrate vertically within the tank 305 to assist in the dispersion of the coal agglomerates.

The hydrophobic liquid used in the tank 305 can be, but is not limited to, n-alkanes (such as pentane, hexane, and heptanes), n-alkenes, unbranched and branched cycloalkanes and cycloalkenes with carbon numbers of less than eight, ligroin, naphtha, petroleum naptha, petroleum ether, liquid carbon dioxide, and mixtures thereof. The preferred hydrophobic liquid is pentane.

The screen aperture should be larger than the size of the largest particles constituting the hydrophobic agglomerates, so that dispersed particles can freely pass through the screens mesh. The strength of screen vibrational, as measured by the acceleration due to vibration normalized by gravitational acceleration, is in the range of 0.5 to 10 for the case of coal agglomerates formed by particles of less than 44 μm. The vibrational strength is given as $$\varsigma = \frac{A\omega^2}{g} = \frac{A(2\pi f)^2}{g} \quad [2]$$

where A is the amplitude of vibration in meter, w is the angular velocity of the motor creating vibration, f is the frequency of vibration in Hz, and g is the gravitational acceleration. If ς is too small, agglomerates do not break, while if ς is too large, water-in-oil emulsions are formed.

Figure 4:
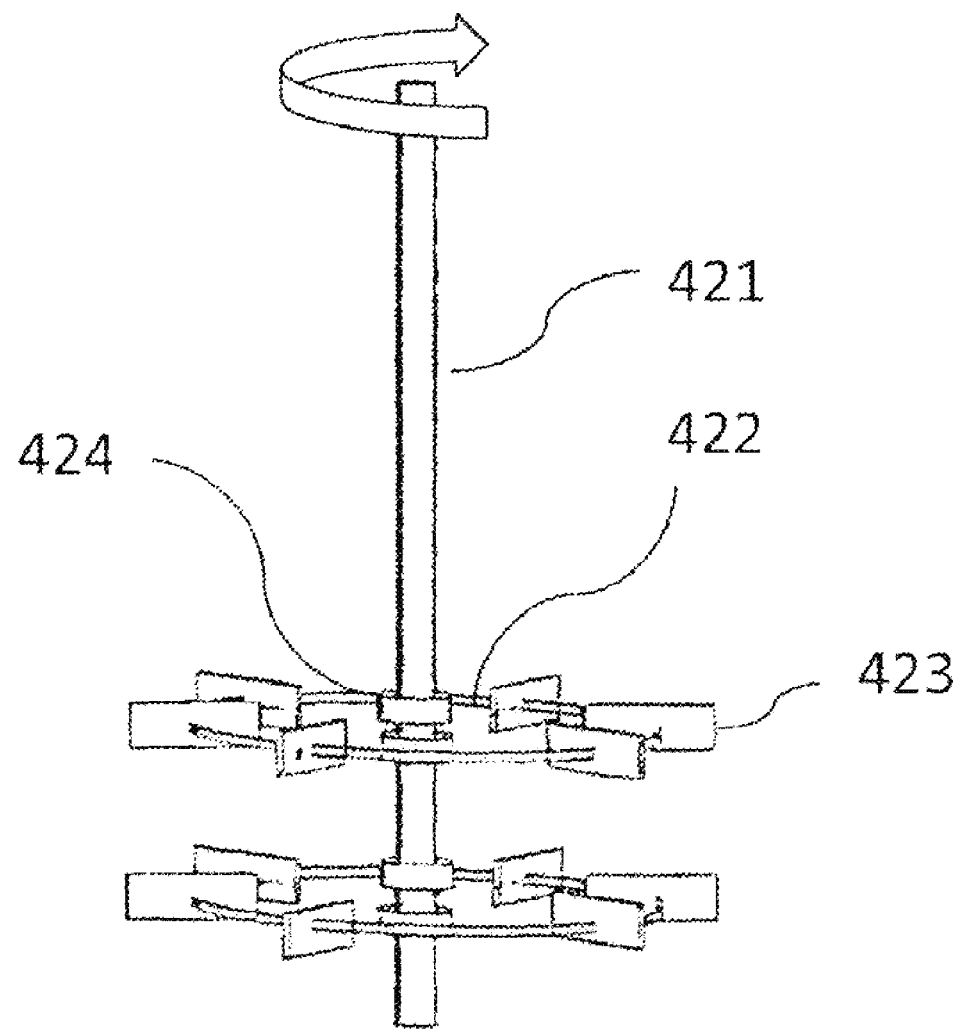
FIG. 4 is a set of Rushton impellers connected to a rotating shaft that can be used to create a turbulence to break hydrophobic agglomerates and disperse the hydrophobic particles in hydrophobic liquid.
Figure 5:
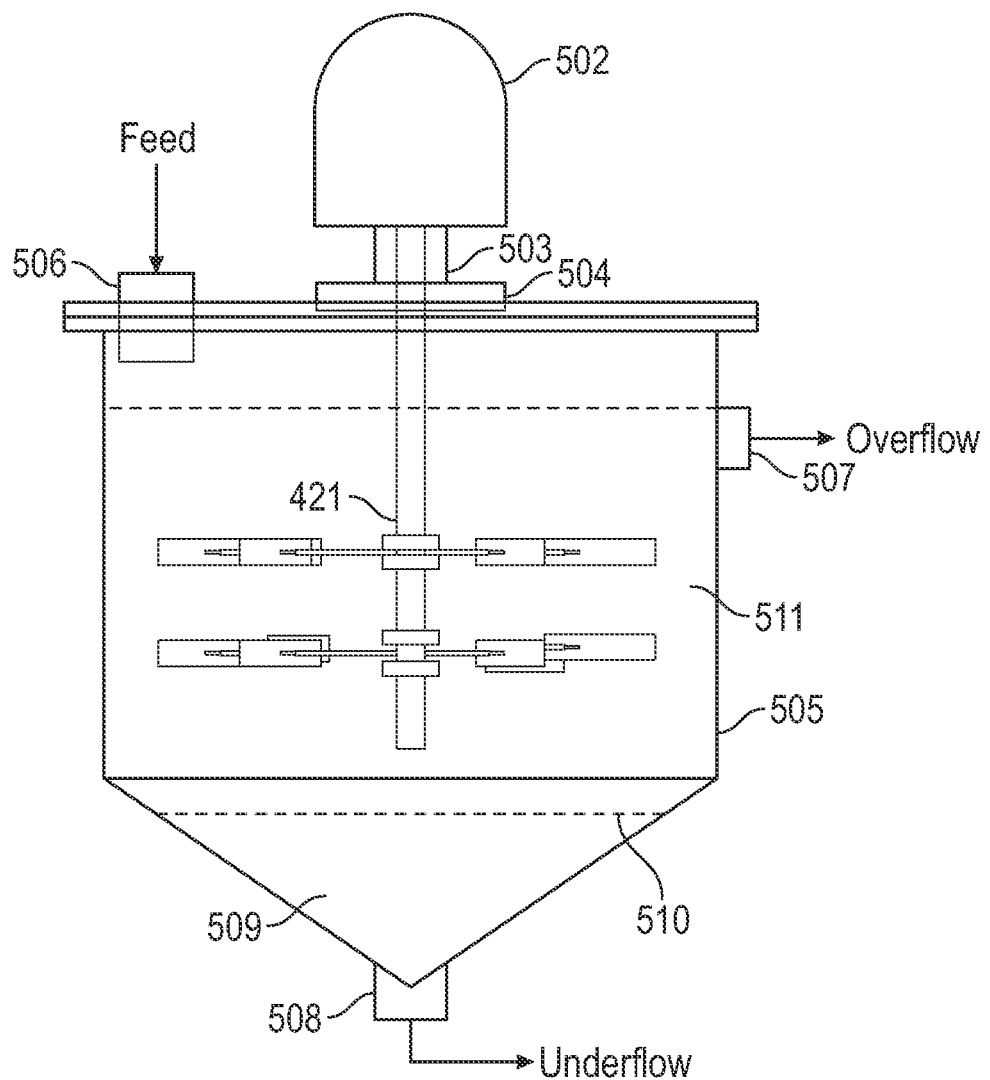
FIG. 5 is a drawing of the assembly of Rushton impellers installed inside a cylindrical tank.

Another embodiment of the present invention is shown FIGS. 4 and 5, which essentially depicts a Rushton turbine as an example of using a dynamic impeller as a turbulence generating mechanism. The device contains of a flat disk 422 mounted on a rotating shaft 421 by means of ring clamps 424 with flat blades 423 vertically mounted. The shaft-impeller assembly is rotated by an electrical motor 502. To isolate hydrocarbon vapors from the outside atmosphere, a vapor tight boot 503 and seal 504 may be installed around the shaft outside the reactor.

FIG. 5 shows a Rushton impeller installed in a cylindrical tank 505. A hydrophobic agglomerate is fed to a feed pipe 506 to allow for the agglomerates to be broken by the turbulence created by the impellers, fixed onto the shaft 421. Breakage of the agglomerates disperses hydrophobic particles in the hydrophobic liquid phase 511, while at the same time releasing (or liberating) the small droplets of water that have been trapped in between the hydrophobic particles constituting the agglomerates. The hydrophobic particle-in-hydrophobic liquid dispersion 511 overflows into a discharge box 507 to be removed from the tank 505, while the liberated water droplets fall by gravity to form an aqueous phase 509 at the bottom, forming a water-hydrophobic liquid phase boundary 510. As the water trapped in the hydrophobic agglomerates is removed from the hydrophobic particles as described above, the hydrophilic mineral matter such as clay is also removed. Thus, the device described above is capable of simultaneously removing both water and mineral matter from fine particles. The separation process described for this embodiment is essentially the same as for the vibrating screen embodiment (FIGS. 1-3), except that Ruston impellers are used instead of vibrating screens.

Figure 6:
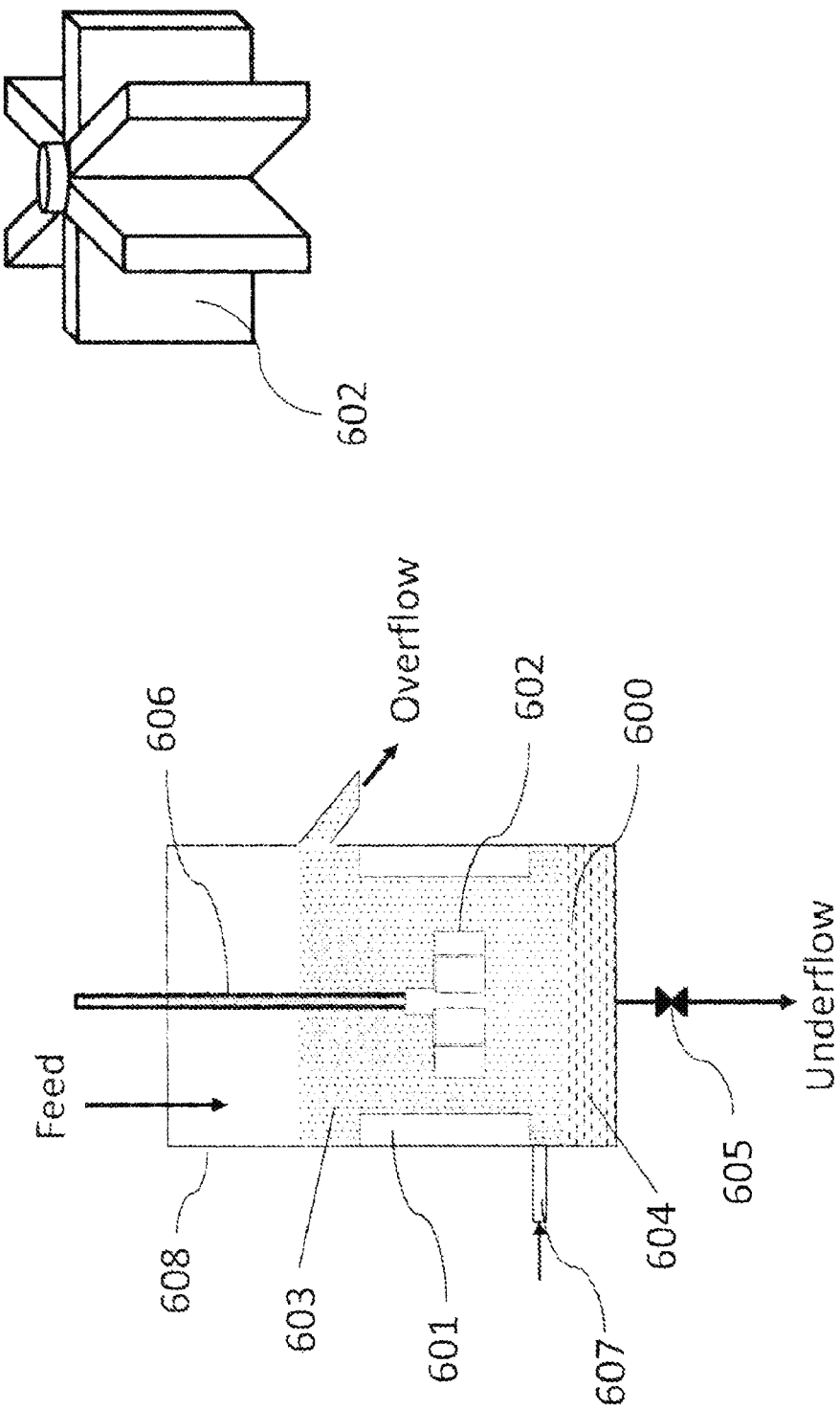
FIG. 6 is a drawing of the assembly of Wemco-type impeller installed inside a baffled cylindrical tank.

FIG. 6 shows another embodiment of the present invention in which coal agglomerates are fed into a cylindrical vessel 608. The vessel is shown equipped with 4 baffle plates 601 situated near the oil/water interface 600 between the hydrophobic oil phase 603 and the water phase 604 located at the bottom of vessel 608. The impeller 602 is a six-blade radial flow impeller of the same shape as the Wemco®-type flotation machine marketed by FLSmidth, and is coupled to a rotating shaft 606 that rotates the impeller 602 to create turbulence in the middle of the vessel 608 rather than near the vessel wall. The de-agglomerated hydrophobic coal particles in suspension are recycled via the outlet depicted at 607, while the de-entrained water droplets and mineral matter dispersed therein are separated as underflow from the bottom of the vessel 608 beneath the baffles 601.

Figure 7:
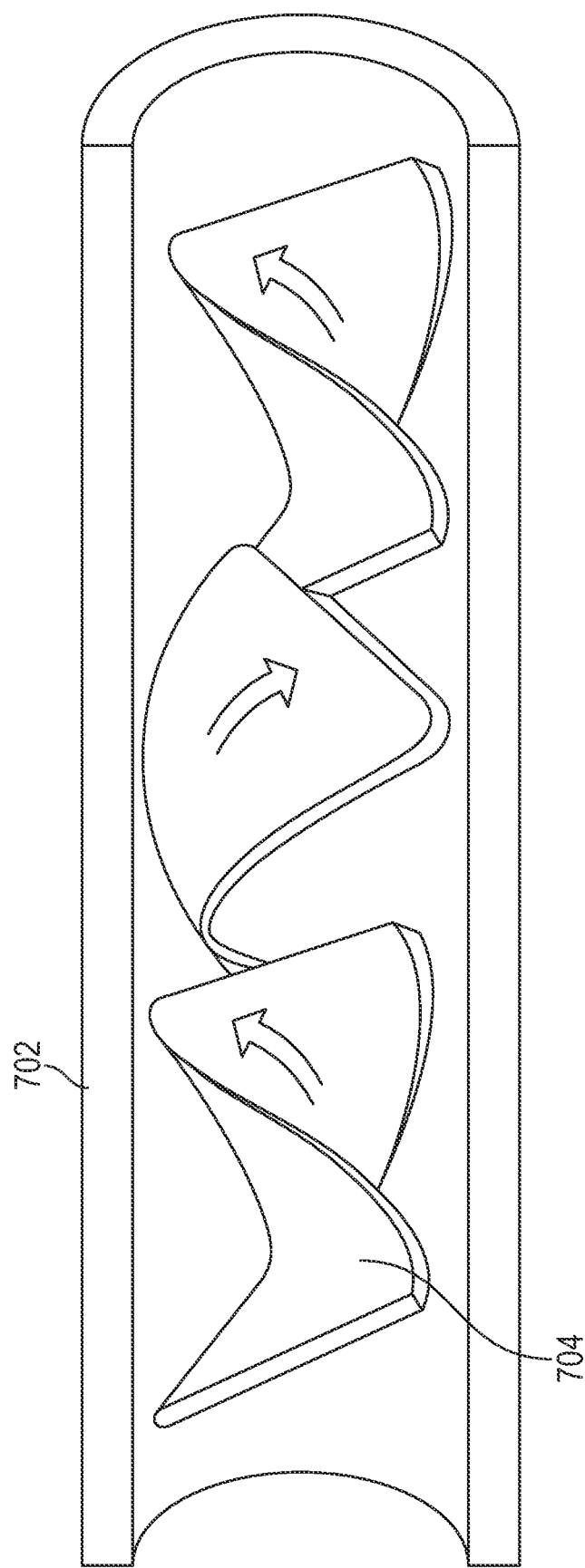
FIG. 7 is a drawing of an inline mixer, which is designed to generate a turbulence that can be used to break hydrophobic agglomerates while they pass through the tortuous path created by twisted blades.

FIG. 7 shows a further embodiment of the present invention which is an in-line static mixer. The in-line static mixer is designed to create turbulence while hydrophobic agglomerates move through a pipe 702. The degree of turbulence is controlled by varying the number and shape of the mixing elements 704 installed in the pipe and the fluid velocity. This embodiment essentially contains a pipe 702 which has mixing elements 704 installed within the pipe. The mixing elements 704 may have different shapes and designs to create turbulence as the fluid containing the agglomerates passes through the pipe. The turbulence is sufficient to disperse or break up the agglomerates to release the trapped water and associated hydrophilic minerals.

Figure 8:
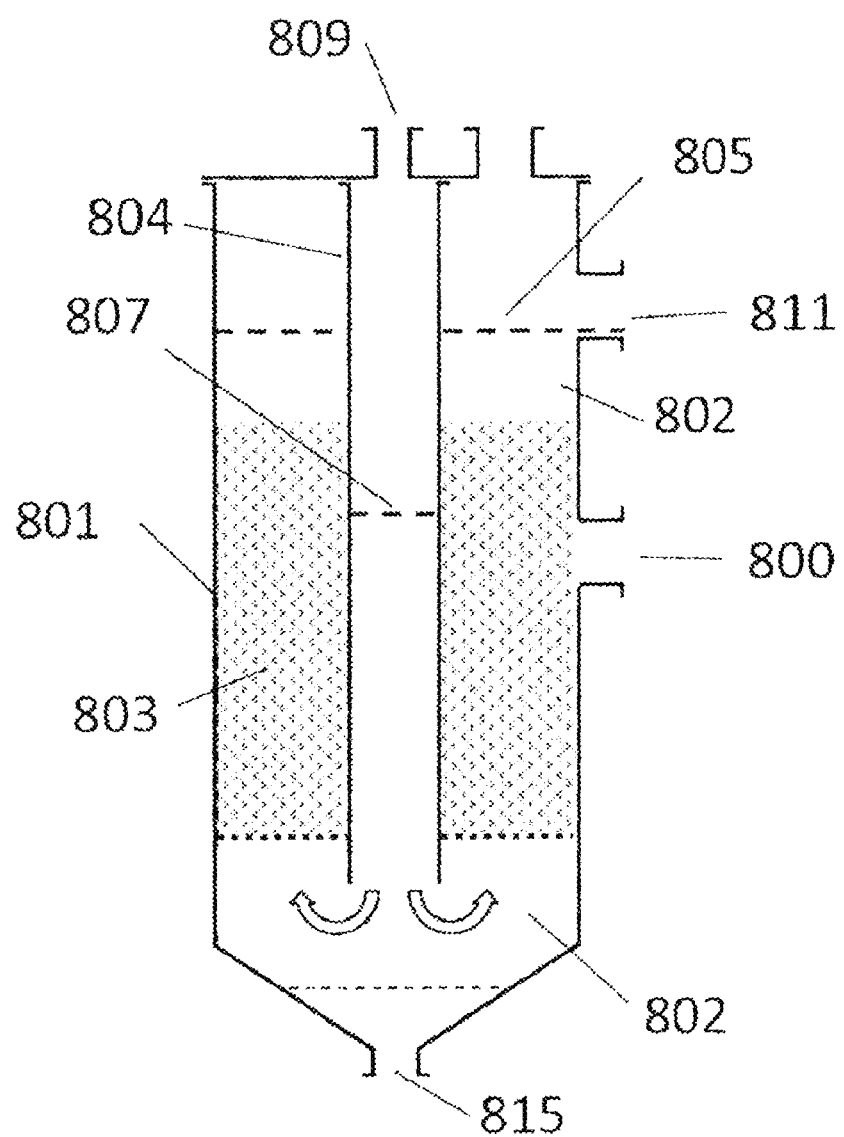
FIG. 8 is a drawing of an apparatus, in which hydrophobic agglomerates are broken by the turbulence created by the pulsating fluid moving upward through a packed bed of corrugated materials.

FIG. 8 shows an additional embodiment of the present invention, in which hydrophobic agglomerates are broken up by pulsating them through the tortuous path in between the packing materials placed in a tank or column. A feed is introduced through a port 800 into the device 801, which is filled with hydrophobic liquid 802 and packing materials 803. A pulse of compressed air is injected through a top port 809 on the top to push the level 807 of the hydrophobic liquid inside the centrally located tubing 804 downward, which in turn pushes the liquid level 805 outside the tubing 804 upward. When the pulse stroke stops, the liquid level 807 in the tubing 804 is restored, while the liquid level 805 in the outer portion is lowered. The pulse and stop cycle moves the agglomerates up and down through the tortuous path in between the packing materials 803, causing the hydrophobic agglomerates or the water-in-hydrophobic liquid emulsion to break-up and the individual hydrophobic particles to be dispersed in the hydrophobic liquid. The hydrophobic particles fully dispersed in the hydrophobic liquid are removed through the discharge port 811, while the water droplets released from the agglomerates and the hydrophobic mineral matter dispersed in the water fall to the bottom and are discharged through the bottom port 815 of the device. The efficiency of the unit is controlled by pulse-and-stop cycle, residence time, and packing materials.

Figure 9:
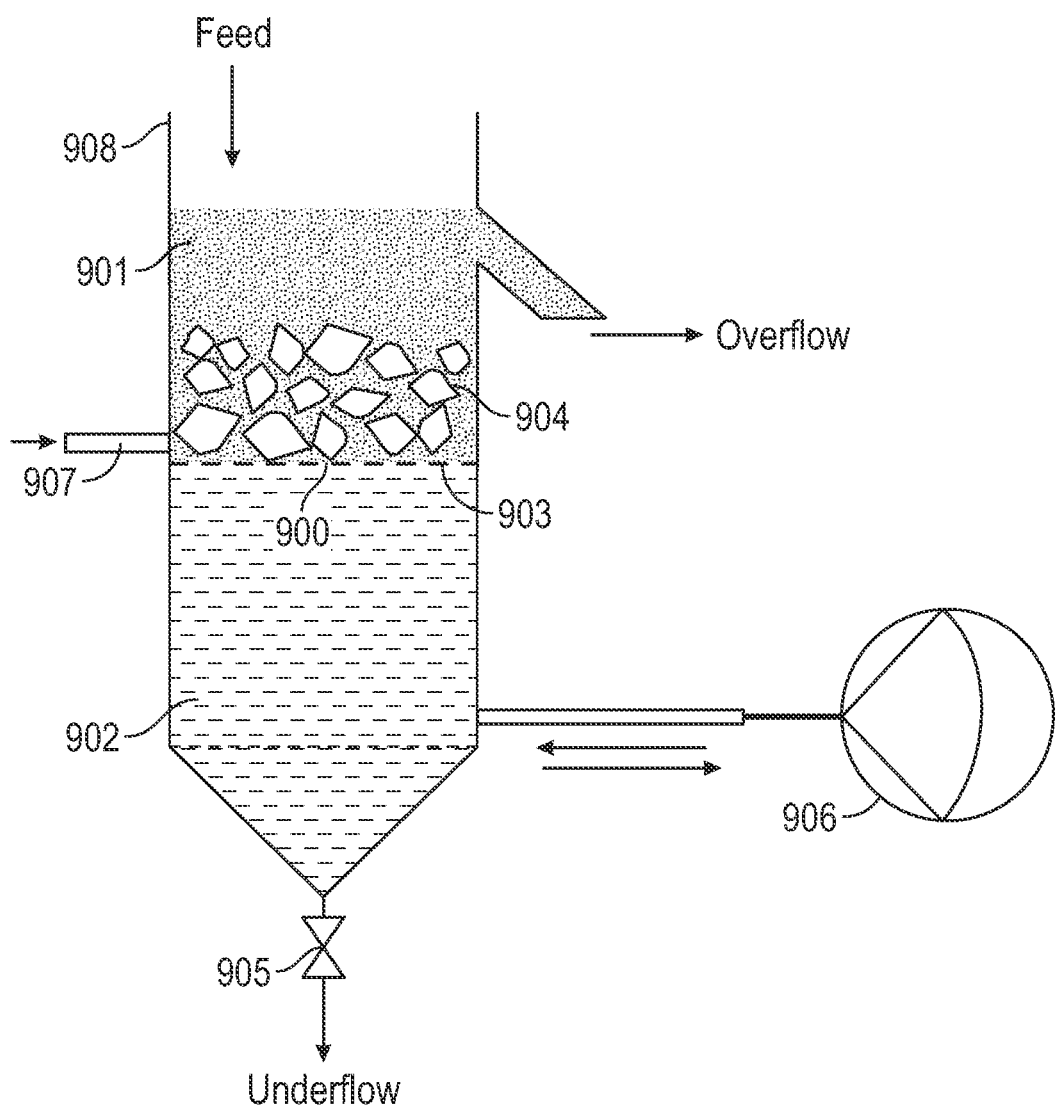
FIG. 9 is a drawing of an apparatus, in which hydrophobic agglomerates are broken by the turbulence created by the pulsating fluid moving upward and down repeatedly through a ragging material located on a screen in the same manner as a pulsating jig used for solid/solid separation in the minerals and coal industry.

FIG. 9 shows another embodiment of the present invention in which the coal agglomerates are fed into a pulsating jig vessel 908. Hydrophilic quartz particles (ragging) 904 are packed atop a screen mesh 903 disposed in the interior of the vessel 908. The aperture of the screen mesh is smaller than the size of the particles 904 such that the particles 904 are unable to pass through the screen mesh and remain dispersed in the hydrophobic oil phase 901 while de-entrained water and mineral matter coalesce on the surface of the particles 904 forming droplets. When droplet size become sufficiently large, the coalesced water and mineral matter fall off the surface of the particles 904, pass through the mesh screen and oil water interface 900, where they are separated as underflow from the water phase 902. In operation, a modified diaphragm pump 906 provides the pulsion and suction (jigging) cycles that force the agglomerates through the tortuous path between the packed quartz particles, liberating the entrained water and mineral matter, while the de-agglomerated hydrophobic coal particles in suspension are recycled via the outlet depicted at 907.

Without further description, it is believed that one of ordinary skill in the art can, using the preceding description and the following illustrative examples, make and utilize the devices of the present invention and practice the claimed methods. The following examples are given to illustrate the present invention. It should be understood that the invention is not to be limited to the specific conditions or details described in these examples.

EXAMPLES

The foregoing designs and devices have been tested for mechanically dispersing hydrophobic agglomerates of coal in hydrophobic liquid both in laboratory and proof-of-concept (POC) scale. The latter was a small scale continuous test unit which was capable of producing 50 to 100 lb/hr of clean coal. Coal is naturally hydrophobic and, hence, can form agglomerates in water in the presence of a relatively small amounts of hydrophobic liquid (or hydrocarbon oil) and be dispersed in the liquid.

Most of the minerals occurring in nature such as apatite and chalcopyrite are naturally hydrophilic. When a given mineral is appropriately hydrophobized, however, the devices disclosed in the instant invention may also be used to first agglomerate the mineral fines using a hydrophobic liquid and subsequently disperse them in a hydrophobic liquid in the same manner as described for coal fines.

The coal samples used in the examples shown below were freshly generated aqueous slurries rather than those that had already been deposited in fine coal impoundments. Three different types of coal fines were tested; 100 mesh×0 (or 0.15 mm×0) flotation feeds, overflows from 6-inch diameter de-sliming cyclones, and effluents from clean coal dewatering centrifuges (screen-bowl). The latter two samples consisted of coal and high-clay mineral fines of <44 µm dispersed in water, with solids contents in the range of 3 to 10% solids. All coal samples were used as received.

In a given laboratory test, a volume of coal slurry was agitated in a kitchen blender equipped with a 600 ml glass container at a high rotational speed for 40 to 60 seconds in the presence of n-pentane. The hydrophobic agglomerates formed under this condition were usually small. By agitating the slurry further at a lower speed for 2 to 5 minutes, the agglomerate became large enough to be separated from dispersed hydrophilic mineral matter by screening. The hydrophobic agglomerates recovered as screen overflows typically contain 45 to 70% moisture. There are two reasons for the high moisture contents; one is the water adhering on coal surface (surface moisture), and the other is the water droplets entrapped within the porous structure of hydrophobic agglomerates. The hydrophobic agglomerates also assay high ash contents, typically in the range of 8 to 15% as significant amounts of mineral matter are dispersed in the entrapped water droplets.

The hydrophobic agglomerates were then placed in a laboratory-scale device containing a sufficient volume of n-pentane. A mechanical force was applied to break the agglomerates and subsequently disperse the hydrophobic (or coal) particles in a hydrophobic liquid (n-pentane). The mechanical forces were created by means of vibrating screen mesh, dynamic mixer, sonicator, and a pulsating jig. As hydrophobic agglomerates were broken (or destabilized), entrapped water droplets were liberated from coal and settled to the bottom of the device along with the hydrophilic mineral matter dispersed in the water droplets. The coal-in-pentane dispersion were allowed to overflow into a beaker, while the water and mineral matter settled to the bottom. The coal-in-pentane dispersion recovered in the beaker was subjected to solid-liquid separation, and the coal was subsequently analyzed for moisture and ash contents.

The device equipped with a set of vibrating mesh screens (FIGS. 1, 2, and 3) was also tested at a proof-of-concept (POC) scale continuous operation. Typically, four to five 55-gallon drums of coal slurry were fed to the POC unit while collecting both the clean coal and reject streams. The former was analyzed for ash and moisture contents, while the latter for ash content.

Example 1

In this example, two Pittsburgh coal samples of different particle sizes were agglomerated under conditions of high-shear agitation, followed by low-shear agitation in the presence of small amounts of n-pentane. The hydrophobic agglomerates recovered as screen overflow were analyzed for moisture. As shown in Table 1, the moisture contents of the 44 µm×0 and 150 µm×0 materials were 51.2 and 45.2% by weight, respectively. The high moisture contents of the hydrophobic agglomerates were due to the water droplets entrapped within the agglomerate structures or the water-in-oil emulsions stabilized by the hydrophobic particles.

TABLE 1

| Particle Size (µm) | Feed Ash (%) | Agglomerate Moisture (%) | Dispersed Product Moisture % | Dispersed Product Ash % | Reject Ash (%) | Combustible Recovery (%) |
|---|---|---|---|---|---|---|
| <44 | 40.4 | 51.2 | 3.9 | 4.3 | 85.8 | 89.4 |
| <150 | 55.7 | 45.2 | 1.8 | 4.7 | 90.6 | 87.4 |

When the hydrophobic agglomerate were subsequently dispersed in a laboratory-scale device, the moisture contents were reduced to 3.9 and 1.8 respectively, which can be attributed to the breakage of the hydrophobic agglomerates, which in turn liberated the water droplets from coal. The device used in this example was equipped with a vibrating screen mesh as shown in FIGS. 1 to 3. This example demonstrates the essential role of that device for producing low-ash and low-moisture coals from fine coal slurry.

Example 2

Table 2 shows the results obtained with two different 100 mesh×0 (or 0.15 mm×0) flotation feeds, one from Pennsylvania and the other from southern West Virginia. The agglomeration products were dispersed in n-pentane in a laboratory-scale device equipped with two vibrating mesh screens, as depicted in FIG. 3. The vibration strengths employed were in the range of 0.8 to 10, as calculated using Eq. [2] With the Pennsylvania coal, the ash content was reduced from 44.9% in the feed to 3.4% in the clean coal product with 1.6% moisture. With the southern West Virginia coal, the feed ash was reduced from 52.6% to 3.6% with 1.0% moisture. Both the ash and moisture contents were substantially lower than obtainable by flotation or oil agglomeration processes. The main reason for the superior results was the removal of the water droplets and the mineral matter entrapped within the hydrophobic agglomerate structure. The amount of energy required to break the agglomerates was small as the driving force for the agglomeration was hydrophobic force, which is a weak force.

TABLE 2

| Coal Sample | Feed Ash (% wt) | Clean Coal (% wt) Moisture | Clean Coal (% wt) Ash | Reject Ash (% wt) | Combustible Recovery (% wt) |
|---|---|---|---|---|---|
| Pennsylvania | 44.9 | 1.6 | 3.4 | 89.1 | 90.4 |
| Southern WV | 52.6 | 1.0 | 3.6 | 91.7 | 90.3 |

Example 3

In the U.S. coal industry, 100 mesh×0 fine coals are deslimed using 6-inch diameter classifying cyclones to remove a substantial portion of the 44 μm×0 particles. The deslimed coals are then cleaned by flotation and subsequently dewatered by screen-bowl centrifuges. In this example, two different cyclone overflows, one from central West Virginia and the other from northern West Virginia, were subjected to the hydrophobic-hydrophilic separation (HHS) process using the device equipped with vibrating screen mesh (FIG. 3). As shown in Table 3, the HHS process produced low-ash and low-moisture products, which can be attributed to the liberation of entrapped water and mineral matter from the hydrophobic agglomerates by the mechanical forces created by the vibrating screens.

TABLE 3

| Coal Sample | Feed Ash (% wt) | Clean Coal (% wt) Moisture | Clean Coal (% wt) Ash | Reject Ash (% wt) | Combustible Recovery (% wt) |
|---|---|---|---|---|---|
| Central WV | 53.6 | 3.5 | 3.9 | 88.0 | 84.7 |
| Northern WV | 50.9 | 3.4 | 3.6 | 89.3 | 87.9 |

Example 4

As noted in Example 3, deslimed flotation products (clean coal) are dewatered using screen-bowl centrifuges. The centrifuges are designed to remove part of the 44 μm×0 particles to improve dewatering. Still the moistures are typically in the range of 18 to 25% depending on coal type and particle size distribution. The screen-bowl effluents are discarded to impoundments. In this example, three different screen-bowl effluents were subjected to laboratory HHS tests using a device equipped with vibrating mesh screens (FIG. 3). The ash contents of the feeds were low as they were essentially clean coal products. As shown in Table 4, low-ash and low-moisture clean coal products were obtained with over 96% combustible recoveries. These examples demonstrate the efficacy of the HHS process and the device equipped with vibrating screens.

TABLE 4

| Coal Sample | Feed Ash (% wt) | Clean Coal (% wt) Moisture | Clean Coal (% wt) Ash | Reject Ash (% wt) | Combustible Recovery (% wt) |
|---|---|---|---|---|---|
| Northern WV | 13.7 | 4.9 | 5.0 | 76.3 | 96.7 |
| Virginia | 11.3 | 3.3 | 2.4 | 82.9 | 97.9 |
| Southern WV | 10.7 | 2.1 | 3.1 | 77.6 | 97.5 |

Example 5

When hydrophobic agglomerates are fed to a device, it takes time for them to be broken by mechanical forces and fully dispersed. In general, the longer the retention time of the agglomerates, the lower the ash and moisture contents, which however causes the throughput to decrease. One way to overcome this problem would be to increase the solids contents in a device. Table 5 shows the effects of solids contents and retention times on the product moistures. The tests were conducted on the cyclone overflow of a Southwest Va. coal using a device equipped with vibrating screens (FIG. 3). As shown, product moistures increase with increasing solids contents or with increasing throughput; however, the moisture contents were not excessively high even at high solids contents.

TABLE 5

| | Product Moisture (% wt) Retention Time (min) | | |
|---|---|---|---|
| % Solids | 2 | 4 | 6 |
| 2 | 3.3 | 5.3 | 4.7 |
| 6 | 8.5 | 4.6 | 5.6 |
| 10 | 9.4 | 9.6 | 11.2 |

Example 6

Table 6 shows the POC-scale continuous test results obtained on three different fine coal slurries. The throughput of the POC test unit ranged from 50 to 100 lb/hr, depending on the solids content and particle size of the particles in feed slurry. The first example represents the results obtained on an effluent from a clean coal centrifuge (screen-bowl). The solids content of the feed slurry was 3.8% solids (or 96.2% water), and the feed coal assayed 7.0% ash. From this coal, the POC unit produced a clean coal assaying 2.1% ash, 4.0% moisture, and 14,123 Btu/lb. Despite the relatively low reject ash, the combustible recovery of the POC-scale test was 97% by weight.

The second and third examples given in Table 6 represent the POC-scale test results obtained on the ultrafine waste coals (de-sliming cyclone overflows) heading toward impoundments. Both the southwest Virginia and northern West Virginia coals were clayey metallurgical coals in dilute suspensions (7.3 and 3.8% solids) with >50% ash. After a single pass through the POC unit, clean coal products assaying 2.4 and 3.4% ash with 6.1 and 8.5% moisture, respectively, were obtained.

The device used in these examples was equipped with vibrating screen meshes to create a grid turbulence that can be used to break the hydrophobic agglomerates (or destabilize the water-in-pentane emulsions) and disperse the individual coal particles in a hydrophobic liquid (n-pentane).

TABLE 6

| Coal Sample | Feed (% wt) Solids | Feed (% wt) Ash | Clean Coal (% wt) Moisture | Clean Coal (% wt) Ash | Reject Ash (% wt) | Combustible Recovery (% wt) |
| --- | --- | --- | --- | --- | --- | --- |
| Virginia | 3.8 | 7.0 | 4.0 | 2.1 | 64.4 | 97.0 |
| Southwest VA | 7.3 | 55.7 | 6.1 | 2.4 | 89.5 | 85.5 |
| Northern WV | 3.8 | 53.0 | 8.5 | 3.4 | 84.4 | 79.7 |

Example 7

In this example, Rushton impellers shown in FIGS. 4 and 5 were used to mechanically break the coal agglomerates formed in a kitchen blender in the presence of a small amount of n-pentane. The coal sample was a ~44 μm×0 classifying cyclone overflow assaying 53.6% ash, destined to a fine coal impoundment. The coal agglomerates formed after a low-shear agitation were fed to a laboratory-scale device equipped with two layers of Rushton impellers as shown in FIG. 5. The impellers were agitated at tip speeds in the range of 30 to 60 ft/min, which was sufficient to break the agglomerates and keep the particles suspended in n-pentane. The coal-in-pentane suspensions were allowed to overflow continuously into a beaker, while the liberated water droplets and mineral matter dispersed in them fell to the bottom. After appropriate solid/liquid separations, the clean coal and reject products were analyzed for moisture and ash contents, and the results are presented in Table 7. Depending on the feed rate, impeller speed, and location of the impellers within the device, the ash and moisture contents of the clean coal products varied in the ranges of 1.7 to 12.5 and 2.6 to 5.3%, respectively.

TABLE 7

| Feed Ash (% wt) | Product Assays (% wt) Moisture | Product Assays (% wt) Ash | Combustible Recovery (% wt) |
| --- | --- | --- | --- |
| 53.6 | 2.0 | 2.9 | 85.9 |
| 53.6 | 11.7 | 3.0 | 84.7 |
| 53.6 | 3.6 | 2.8 | 85.2 |
| 53.6 | 12.5 | 3.1 | 84.5 |
| 53.6 | 1.8 | 2.6 | 85.7 |
| 53.6 | 1.7 | 2.7 | 85.3 |
| 53.6 | 4.1 | 5.3 | 86.2 |

Example 8

Table 8 shows the results obtained with a laboratory-scale device equipped with an ultrasonic probe (Qsonica, Model-Q700) to break hydrophobic agglomerates. It shows the test results obtained on southern West Virginia and Pennsylvania coals. Both were ultrafine screen-bowl effluents. Each test was run continuously at a vibrational frequency of 20 kHz for 15 to 20 minutes before taking samples. As shown, very low-ash and low-moisture products were obtained using the device, with high reject ashes and combustible recoveries.

TABLE 8

| Coal Sample | Feed (% Ash) | Clean Coal (% wt) Moisture | Clean Coal (% wt) Ash | Reject (% Ash) | Combustible Recovery (% wt) |
| --- | --- | --- | --- | --- | --- |
| ANR-Kingston | 54.5 | 1.2 | 4.4 | 92.4 | 90.5 |
| Consol-Bailey | 41.1 | 1.0 | 3.6 | 87.4 | 90.4 |

Example 9

In this example, hydrophobic agglomerates were produced from a cyclone overflow sample assaying 54.2% ash (dry) and 94% water as received from a bituminous coal preparation plant. Coal agglomerates were fed to a cylindrical vessel of 3-inch diameter. The vessel was equipped with four identical 0.25×2.5-inch baffle plates located 1-inch above the floor of the vessel. The vessel was filled with water and pentane (hydrophobic oil) and allowed to form a distinct oil/water interface at 0.5-inch from the vessel floor. The vessel was equipped with one (or more) six-blade radial flow impeller with a diameter of 2-inch, which was connected to a rotating shaft. The tests were conducted with the impeller positioned at the center of the baffled zone of the vessel, as shown in FIG. 6.

The impeller described above was of the same shape as the Wemco flotation machine marketed by FLSmidth. The impeller was chosen to create a turbulence in the middle of the vessel rather than near the vessel wall. Tests were conducted at 450-850 rpm, which was sufficient to destabilize the hydrophobic agglomerates and to allow the de-agglomerated particles in suspension. The coal-in-pentane suspension free of water droplets were allowed to overflow, while the water droplets setting at the bottom of the vessel along with the mineral matter dispersed in them. Additional hydrophobic-oil was added during the tests to facilitate the overflow of the coal-in-pentane suspension. The coal-in-pentane suspension was subjected to filtration at 2-4 bars of air pressure, which produced essentially dry coal with small amounts of mineral matter as shown in Table 6. As shown, the clean coal products assayed 2.7-3.1% ash and 1.4-2.9% moisture. The organic matter (or coal) recovery and mineral matter rejections were consistently >96% and >97%, respectively.

TABLE 6

| Test # | RPM | HHS Product (% wt.) Moisture | HHS Product (% wt.) Ash | Reject Ash (% wt.) | Organic Matter Recovery (% wt.) | Mineral Matter Rejection (% wt.) |
| --- | --- | --- | --- | --- | --- | --- |
| 1 | 450 | 1.9 | 2.8 | 90.2 | 96.4 | 97.9 |
| 2 | 550 | 1.4 | 2.7 | 90.4 | 96.6 | 97.9 |
| 3 | 650 | 1.9 | 3.0 | 90.4 | 96.7 | 97.7 |
| 4 | 750 | 2.9 | 3.1 | 90.1 | 96.1 | 97.7 |
| 5 | 850 | 2.8 | 3.1 | 90.2 | 96.3 | 97.6 |

Feed Ash = 54.2% (by wt.)

Example 10

The coal agglomerates formed using pentane as agglomerant was fed to a laboratory-scale pulsating jig shown in FIG. 9. Quartz particles of 2-6 mm size were placed on the screen, whose aperture was smaller than the particles, so that the particles stays in the hydrophobic liquid phase while they move up and down following the pulsion and suction cycles of the jigging motion. In this example, the screen mesh panel was located close to the oil-water interface.

The pulsion and suction (or jigging) cycles were generated by modifying a diaphragm pump. The pump was sealed at one end, while the other end was connected to the water-phase in the glass column. The jig was operated at 3-6 Hz and 4-7 mm strokes. The turbulence created in the jig destabilized the hydrophobic agglomerates and allowed the coal particles to be fully dispersed in the oil-phase, while liberating the entrapped water. When the liberated water droplets collide with the hydrophilic quartz particles, they tend to stay on the hydrophilic surface and increase the probability of coalescence, causing the droplet size to grow. When droplet size becomes larger, they drop off the surface and settle quickly and enter the aqueous phase at the bottom along with the hydrophilic particles dispersed in them. As the water level increased, a control valve is open to maintain the oil-water interface close to the fixed mesh panel.

Additional hydrophobic-oil (pentane) was added at a constant flowrate to collect the coal-in-pentane dispersion as overflow. In this example, the oil flowrate was maintained such that the solids content in the organic phase was less than 10-12% by weight. Analysis of the clean coal and refuse products gave the results presented in Table 9. As shown, the clean coal products assayed <4.2% ash and <2.7% moisture. The organic matter recovery and mineral matter rejections were >95% and >97%, respectively.

| Test # | HHS Product (% wt.) Moisture | Ash | Reject Ash (% wt.) | Organic Matter Recovery (% wt.) | Mineral Matter Rejection (% wt.) |
|---|---|---|---|---|---|
| 1 | 2.1 | 4.0 | 90.2 | 95.3 | 97.7 |
| 2 | 2.3 | 3.5 | 90.7 | 96.2 | 98.0 |
| 3 | 1.6 | 4.0 | 90.6 | 96.0 | 97.6 |
| 4 | 2.5 | 3.1 | 91.1 | 97.1 | 98.2 |
| 5 | 1.5 | 3.5 | 91.2 | 97.2 | 98.0 |
| 6 | 1.5 | 4.3 | 90.1 | 95.0 | 97.5 |
| 7 | 1.6 | 4.1 | 90.7 | 96.3 | 97.6 |
| 8 | 2.4 | 3.9 | 91.3 | 97.4 | 97.7 |
| 9 | 2.7 | 4.2 | 91.2 | 97.3 | 97.5 |

Feed Ash = 60.0% (by wt.)

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A method of dispersing hydrophobic particles in a hydrophobic liquid, comprising:
    providing agglomerates of hydrophobic particles including water droplets and hydrophilic mineral matter entrained therein to a container, wherein said container includes a hydrophobic liquid;
    breaking the agglomerates and liberating the water droplets and hydrophilic mineral matter from said agglomerates by moving the agglomerates through a) a path in a packing material, b) a path in a ragging material, or c) an in-line static mixer;
    removing the hydrophobic liquid and the hydrophobic particles from the container through a first outlet; and
    discharging the water droplets and hydrophilic mineral matter from the container through a second outlet.

2. The method of claim 1, wherein the hydrophobic liquid is pulsed to move the agglomerates up and down through the paths in the packing material.

3. The method of claim 1, wherein said agglomerates are water-in-oil emulsion droplets stabilized by hydrophobic particles and suspended in the hydrophobic liquid.

4. The method of claim 1, wherein said agglomerates are stabilized by asphaltenes.

* * * * *